United States Patent
Subash et al.

(10) Patent No.: US 6,275,924 B1
(45) Date of Patent: Aug. 14, 2001

(54) SYSTEM FOR BUFFERING INSTRUCTIONS IN A PROCESSOR BY REISSUING INSTRUCTION FETCHES DURING DECODER STALL TIME

(75) Inventors: Chandar G. Subash, Coimbatore; Deepak Mital, New Delhi, both of (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/153,370

(22) Filed: Sep. 15, 1998

(51) Int. Cl.[7] ..................................................... G06F 9/32
(52) U.S. Cl. ............................................. 712/207; 712/219
(58) Field of Search ..................................... 712/205, 206, 712/207, 219

(56) References Cited

U.S. PATENT DOCUMENTS

| | | | |
|---|---|---|---|
| 4,179,731 | * 12/1979 | Yamazaki ............................. | 712/219 |
| 4,251,859 | * 2/1981 | Momose et al. ..................... | 712/219 |
| 4,709,324 | * 11/1987 | Kloker ................................. | 712/207 |
| 4,719,570 | * 1/1988 | Kawabe ............................... | 712/207 |
| 4,924,376 | * 5/1990 | Ooi ...................................... | 712/207 |
| 5,212,777 | * 5/1993 | Gove et al. .......................... | 712/229 |
| 5,317,701 | * 5/1994 | Reininger et al. ................... | 712/207 |
| 5,619,663 | * 4/1997 | Mizrahi-Shalom et al. ......... | 712/207 |
| 5,680,564 | * 10/1997 | Divivier et al. ..................... | 712/207 |

* cited by examiner

*Primary Examiner*—Richard L. Ellis
(74) *Attorney, Agent, or Firm*—Bret J. Petersen; Frederick J. Telecky, Jr.

(57) ABSTRACT

According to one embodiment of the invention, a method of buffering instructions in a processor having a pipeline having a decode stage includes detecting stalling of the decode stage, reissuing a previous fetch for an instruction in a memory until the decode stage is no longer stalled, and writing the fetch instruction into an instruction buffer after the decode stage is no longer stalled.

20 Claims, 3 Drawing Sheets

SYSTEM FOR BUFFERING INSTRUCTIONS IN A PROCESSOR BY REISSUING INSTRUCTION FETCHES DURING DECODER STALL TIME

TECHNICAL FIELD OF THE INVENTION

This invention relates generally to processors and more particularly to a method and system for buffering instructions in a processor.

BACKGROUND OF THE INVENTION

Many modern processors utilize a pipeline within the processor for greater efficiency. With the use of a pipeline, a task is subdivided into a number of sequential subtasks. The division of a task into sequential subtasks allows fetching, decoding, and execution of a number of program instructions at any given time. Therefore, at any particular time, several instructions may be processed in various stages at the pipeline. Many such processors include a pipeline having a decode stage. At the decode stage of a pipeline, an instruction obtained from program memory is decoded so that the instruction may be executed. After an instruction is decoded, it is not necessary to store the instruction within the processor. However, until the instruction is decoded, the instruction obtained from program memory must be stored. In order to store the instruction until it has been decoded, many processors utilize an instruction buffer.

Conventionally, an instruction buffer includes enough registers to store a number of instructions equal to the number of stages up to and including the decode stage. For example, if a pipeline has a prefetch, a fetch, and a decode stage as its first three stages, the associated instruction buffer would have three registers for storing three instructions. This number of registers in an instruction buffer has been conventionally used because it allows retention of instructions that are being obtained when it is determined that the decode stage is stalled.

Although the use of an instruction buffer allows resuming of processing without loss of information, it is not without its disadvantages. For example, as the size of common instruction fetches increases, each register within the instruction buffer grows in size, which requires additional silicon area.

SUMMARY OF THE INVENTION

Accordingly, a need has arisen for an improved method and system for buffering instructions in a processor. The present invention provides a system and method for buffering instructions in a processor that addresses shortcomings of prior systems and methods.

According to one embodiment of the invention, a method of buffering instructions in a processor having a pipeline having a decode stage includes detecting stalling of the decode stage, reissuing a previous fetch for an instruction in a memory until the decode stage is no longer stalled, and writing the fetch instruction into an instruction buffer after the decode stage is no longer stalled.

According to another embodiment of the invention, a processor pipeline includes a plurality of sequential stages followed by a decode stage and a limited instruction buffer operable to concurrently store a number of instructions less than or equal to the number of sequential stages, and no more. The processor pipeline also includes a counter system. The counter system includes a counter for storing a count designating an address of a memory location that stores an instruction for receipt by the limited instruction buffer. The counter system is also operable to adjust the count of the counter based on a status of the decode stage. The plurality of sequential stages includes a fetch stage that is operable to fetch the instruction at the address designated by the count.

Embodiments of the invention provide numerous technical advantages. For example, in one embodiment of the invention, a limited instruction buffer may be used rather than a conventional larger instruction buffer for buffering instructions fetched from a program memory. The smaller size of the limited instruction buffer reduces silicon area, allowing for smaller devices or the use of such silicon area in other areas of the processor.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1 through 4 of the drawings, like numerals being used for like and corresponding parts of the various drawings.

Figure 1:
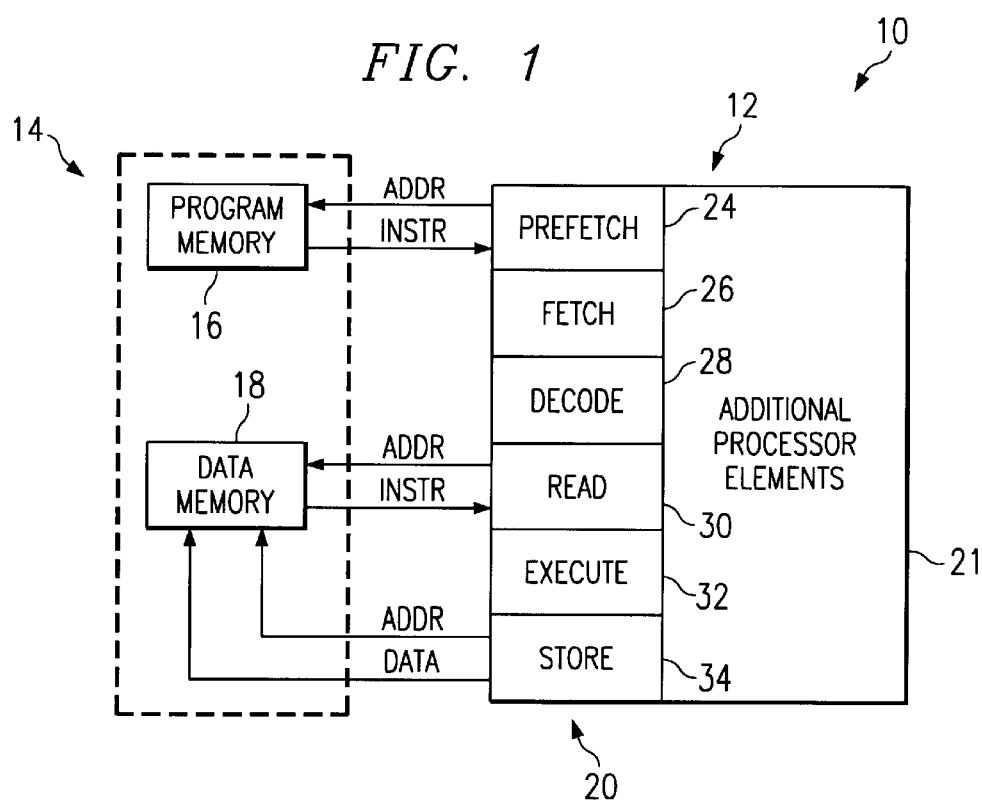
FIG. 1 is a block diagram of a computer system according to the teachings of the present invention.

FIG. 1 is a block diagram of a processor according to the teachings of the present invention. A computer system 10 includes a processor 12 and a memory system 14. Processor 12 is operable to access memory system 14. Memory system 14 may include both a program memory 16 and a data memory 18. Processor 12 includes a pipeline 20. Pipeline 20 includes a prefetch stage 24, a fetch stage 26, a decode stage 28, a read stage 30, an execute stage 32, and a store stage 34. Processor 12 may also include additional processing elements 21.

Figure 4:
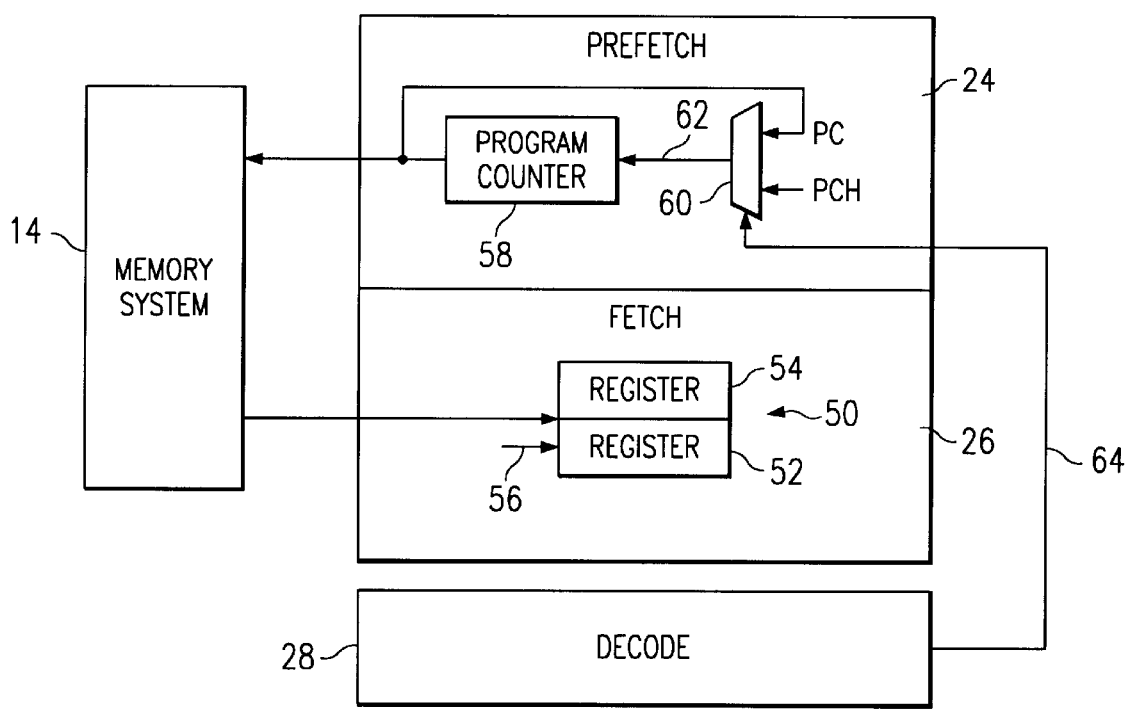
FIG. 4 is a block diagram illustrating additional details of a prefetch stage and a fetch stage of the processor illustrated in FIG. 1.

Prefetch stage 24 determines an address of a memory location in program memory 16 from which to read an instruction. Fetch stage 26 reads the instruction at the program memory location determined by prefetch stage 24. Fetch stage 26 includes a limited instruction buffer 50 for buffering instructions fetched from program memory 16. Limited instruction buffer 50 is illustrated in FIG. 4. In this example, limited instruction buffer 50 includes a first register 52, and a second register 54. According to the invention, limited instruction buffer 50 includes the same number of registers as the number of stages in pipeline 20 that precede decode stage 28, and no more which in this example is two.

Decode stage 28 decodes the instruction obtained from program memory 16. Read stage 30 reads from data memory 18 any data necessary for execution of the instruction decoded by decode stage 28. Read stage 30 may be replaced with more than one stage. For example, read stage 30 may be replaced by a separate stage that performs a computation necessary to determine from which location in data memory 18 data will be read, and a separate stage that performs the function of reading such data. Execute stage 32 performs the function of executing the instruction decoded by decode stage 28. Store stage 34 performs the function of writing any data that may be required to be written after execution of instruction, such as a result.

The use of a limited instruction buffer having a number of registers equal to the number of stages that precede decode stage 28, and no more, reduces silicon area requirements for processor 12. Reduction of silicon area requirements for processor 12 is generally advantageous. According to the invention, a limited instruction buffer may be utilized without any resulting loss of processor performance by reissuing fetches for instructions in program memory 16, as described in greater detail below in conjunction with FIGS. 2 through 4.

Figure 2:
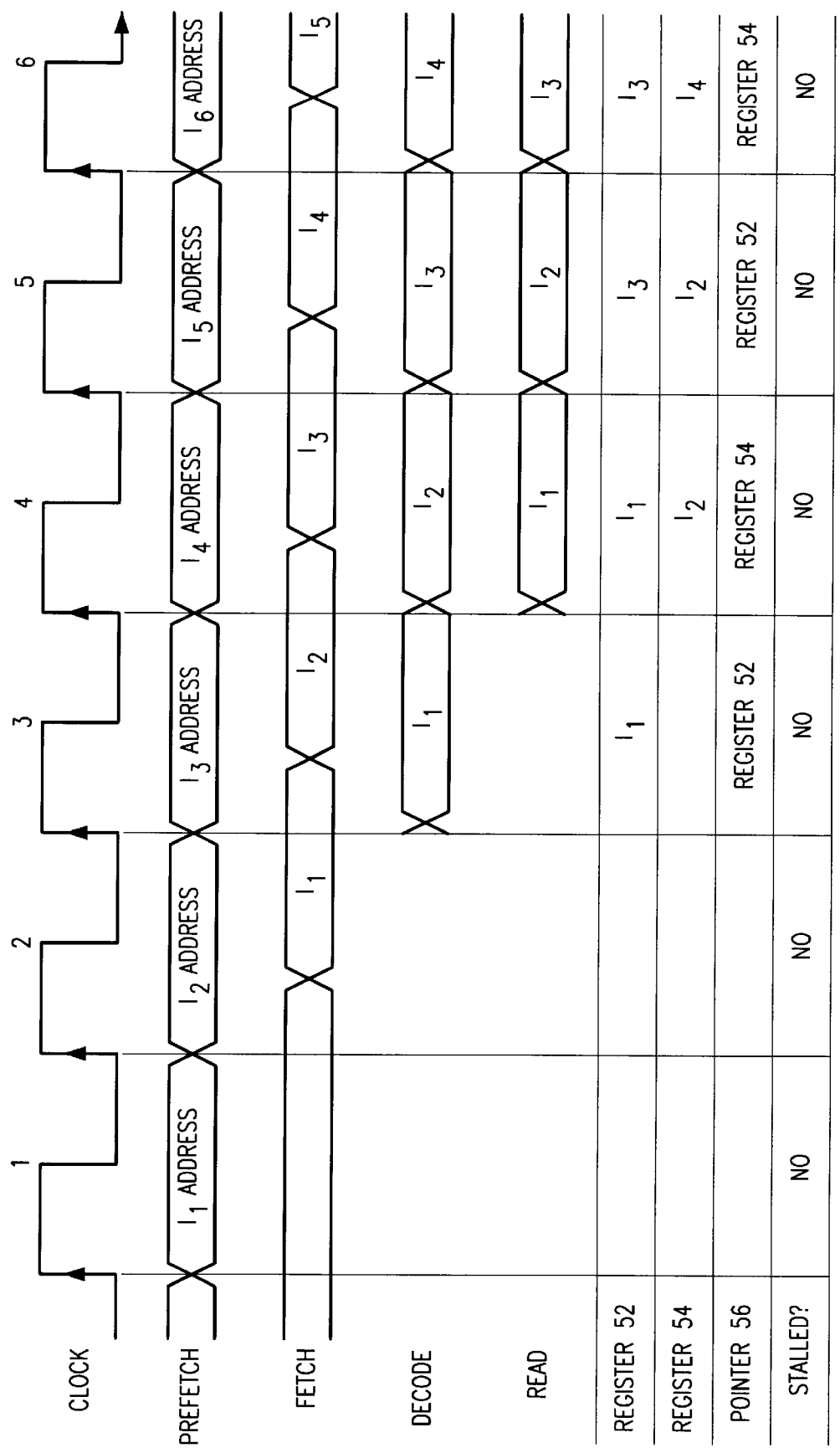
FIG. 2 is a timing diagram illustrating the location of instructions obtained from a program memory of the computer system of FIG. 1 with respect to various stages of the pipeline illustrated in FIG. 1 for an example in which the pipeline does not stall.

FIG. 2 is a timing diagram illustrating the location of instructions obtained from program memory 16 with respect to the various stages of pipeline 20 for an example in which pipeline 20 does not stall. During normal processing, processor 12 continuously fetches instructions from locations in program memory 16 having sequential addresses for execution. If for some reason processor 12 stalls, processor 12 continues to fetch instructions from program memory 16. For example, processor 12 may stall while waiting to receive data from data memory 18. In such a case, limited instruction buffer 50 allows accumulation of two instructions while waiting for processing to resume. The operation of prefetch stage 24, fetch stage 26, and decode stage 28 in conjunction with limited instruction buffer 50 is described below with reference to FIG. 2 for an example in which no stall occurs.

During a first clock cycle, an address for a memory location corresponding to a first instruction $I_1$ is calculated. During a second clock cycle, an address for a second instruction $I_2$ is calculated, and fetching of instruction $I_1$ is initiated. During a third clock cycle, an address for a memory location corresponding to a third instruction $I_3$ is calculated, fetching of instruction $I_1$ is completed, fetching of $I_2$ is initiated, and decoding of instruction $I_1$ is initiated and completed because processor 12 is not stalled.

During a third clock cycle, register 52 of limited instruction buffer 50 stores instruction $I_1$. Limited instruction buffer 50 includes a pointer 56 that points to the register in limited instruction buffer 50 that 15 stores the current instruction to be decoded. Instruction pointer 56 is depicted in FIG. 4 as pointing to register 52. During the third clock cycle, pointer 56 points to register 52. During a fourth clock cycle, an address for a fourth instruction $I_4$ is calculated, fetching of instruction $I_2$ is completed, fetching of instruction $I_3$ is initiated, and decoding of instruction $I_2$ is initiated and completed. During the fourth clock cycle, register 52 continues to store instruction $I_1$ because instruction $I_1$ has not been overwritten by another instruction, register 54 stores instruction $I_2$, and pointer 56 points to register 54.

During a fifth clock cycle, an address for a fifth instruction $I_5$ is calculated, fetching of instruction $I_3$ is completed, fetching of instruction $I_4$ is initiated, and decoding of instruction $I_3$ is initiated and completed. During the fifth clock cycle, instruction $I_3$ is stored in register 52 and pointer 56 of limited instruction buffer 50 points to register 52. During a sixth clock cycle, an address for a sixth instruction $I_6$ is calculated, fetching of instruction $I_4$ is completed, fetching of instruction $I_5$ is initiated, decoding of instruction $I_4$ is initiated and completed, and any data associated with instruction $I_3$ is read. During the sixth clock cycle, instruction $I_4$ is stored in register 54 and pointer 56 of limited instruction buffer 50 points to register 54.

In the above-described sequence of obtaining and processing instructions, limited instruction buffer 50 stores an instruction in one of its two registers 52, 54 as the instruction is being decoded. Because processor 12 does not stall in the above-described sequence, limited instruction buffer 50 is sufficient to allow continued fetching of additional sequential instructions without reissuing any fetches. Operation of processor 12 during intermittent periods of stalling is described in conjunction with FIG. 3.

Figure 3:
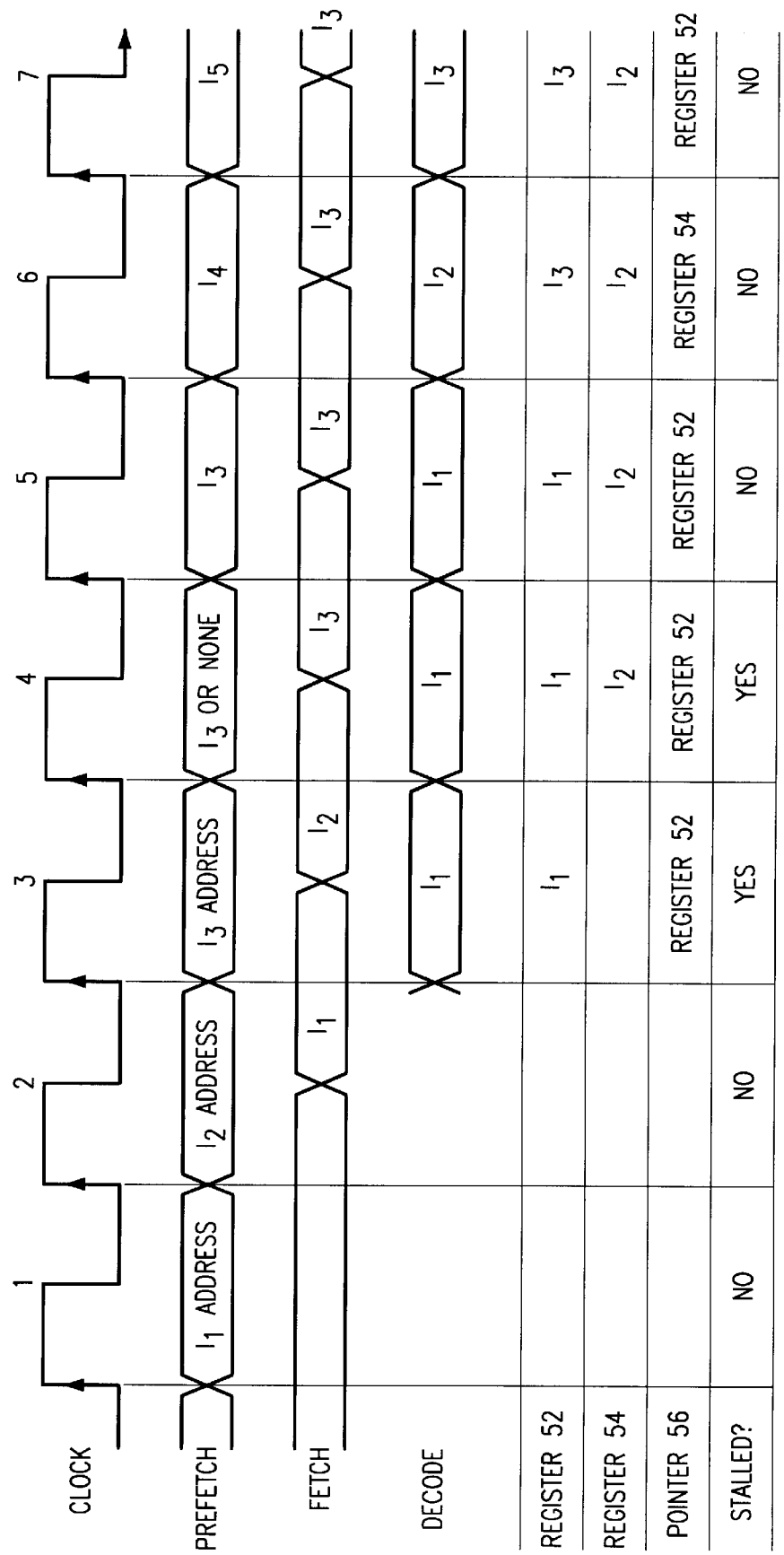
FIG. 3 is a timing diagram illustrating the location of instructions obtained from a program memory of the computer system of FIG. 1 with respect to various stages of the pipeline illustrated in FIG. 1 for an example in which intermittent stalling of the pipeline occurs.

FIG. 3 is a timing diagram illustrating the location of instructions obtained from program memory 16 with respect to various stages of pipeline 20 for an example in which intermittent stalling of pipeline 20 occurs. Operation of prefetch stage 24, fetch stage 26, decode stage 28, and limited instruction buffer 50 is described for the example in which intermittent stalling occurs in pipeline 20. During a first clock cycle, an address for a first instruction $I_1$ is calculated. Stalling of processor 12 does not occur during the first clock cycle, as denoted by the last row of FIG. 3. During a second clock cycle, an address for a second instruction $I_2$ is calculated, and fetching of instruction $I_1$ is initiated. During a third clock cycle, an address for a third instruction $I_3$ is calculated, fetching of instruction $I_1$ is completed, fetching of instruction $I_2$ is initiated, and decoding of instruction $I_1$ is initiated. In this example, decode stage 28 is stalled during the third clock cycle, and therefore decoding of instruction $I_1$ is not completed during the third clock cycle. As used herein, stalling of decode stage 28 refers to actual stalling of decode stage 28 or stalling of another stage in pipeline 20 that prevents decode stage 28 from decoding a next instruction. For example, such a stall may occur due to stalling of read stage 30 during a memory read operation. During clock cycle three, instruction $I_1$ is stored in register 52 and pointer 56 points to register 52.

During a fourth clock cycle, because decode stage 28 was stalled in the previous clock cycle, an additional address associated for a next instruction is not calculated. Fetching of instruction $I_2$ is completed and fetching of instruction $I_3$ is initiated. Because decode stage 28 remains stalled, decoding of instruction $I_1$ continues but is not completed. During this fourth clock cycle, instruction $I_1$ is retained in register 52, instruction $I_2$ is stored in register 54, and pointer 56 remains pointed to register 52.

During a fifth clock cycle, because decode stage 28 was stalled in the previous clock cycle, no additional address is calculated for an additional instruction. Additionally, because limited instruction buffer 50 is full, fetching of instruction $I_3$ may not be completed because instruction $I_3$ may not be stored in instruction buffer 50. Therefore, instruction $I_3$ is discarded and fetching of instruction $I_3$ is reinitiated during the fifth clock cycle. Because decode stage 28 is no longer stalled, decoding of instruction $I_1$ is completed during the fifth clock cycle. Conventional processors would include a third register in an instruction buffer for storing instruction $I_3$ rather than discarding instruction $I_3$ and reissuing a fetch for instruction $I_3$. The present invention does not require such a register and therefore reduces silicon area requirements. During the fifth clock cycle, register 52 stores instruction $I_1$, register 54 stores instruction $I_2$, and pointer 56 points to register 52.

During a sixth clock cycle, decode stage 28 is no longer stalled. Therefore, an address for a fourth instruction $I_4$ is calculated, fetching of instruction $I_3$ is completed, and decoding of instruction $I_2$ is initiated and completed. During the sixth clock cycle, instruction $I_3$ is stored in register 52, instruction $I_2$ is stored in register 54, and pointer 56 points to register 54.

Thus, in the example described in FIG. 3 in which intermittent stalling in pipeline 20 occurs, the instruction for which an address is being calculated when the pipeline stalls is continually issued until the pipeline no longer stalls. Therefore, the present invention avoids the requirement for an instruction buffer having a third register to store an instruction found at the address that is being calculated when the pipeline first stalls, which in the above example is instruction $I_3$. The avoidance of the requirement for such a register in an instruction buffer may be attributed to reissuing the fetch for an instruction, such as instruction $I_3$, when pipeline 20 stalls. An example of a physical implementation of the above-described method for processing instructions is described with reference to FIG. 4.

FIG. 4 is a block diagram illustrating additional details of prefetch stage 24 and fetch stage 26 of processor 12. As illustrated, prefetch stage 24 includes a program counter 58 and a multiplexer 60. Program counter 58 retains a current count for designating a location in memory system 14 from which to receive an instruction. Multiplexer 60 receives the previous count of program counter 58 and the previous count of program counter 58 incremented by one as input signals. Multiplexer 60 produces an output signal 62 that provides an updated count for program counter 58. Multiplexer 60 is controlled by a selection signal 64 received from decode stage 28. When decode stage 28 is stalled, due to stalling of decode stage 28 itself or to stalling of a stage in pipeline 20 downstream of decode stage 28, selection signal 64 selects the previous value of program counter 58 and when decode stage 28 is not stalled, output signal 62 selects the previous count of program counter 58 incremented by one. Output signal 62 is then provided to program counter 58. In this manner, when decode stage 28 is stalled, the most recent instruction for which an address has been calculated by prefetch stage 24 will be continually fetched until decode stage 28 is no longer stalled.

Although the present invention and its advantages have been described in detail, it should be understood the various changes, substitutions, and alterations can be made therein without departing from the spirit and scope of the present invention as defined by the appended claims.

What is claimed is:

1. A method of buffering instructions in a processor having a pipeline having a decode stage, the method comprising the steps of;
    buffering at least two instructions in an instruction buffer in the processor;
    detecting stalling of the decode stage;
    in response to detecting stalling of the decode stage, reissuing a previous fetch for an instruction in a memory until the decode stage is no longer stalled; and
    writing the fetched instruction into an instruction buffer after the decode stage is no longer stalled.

2. The method of claim 1, and further comprising determining whether the instruction buffer is full.

3. The method of claim 2, wherein the step of reissuing a previous fetch comprises reissuing a previous fetch for an instruction stored in a memory only if the instruction buffer is full.

4. The method of claim 1, wherein the step of reissuing a previous fetch comprises fetching an instruction stored in a memory location having an address designated by a count of a program counter.

5. The method of claim 4, wherein the step of reissuing a previous fetch comprises adjusting the count of the program counter to a count corresponding to the address of the memory location from which a previous instruction was fetched.

6. The method of claim 5, wherein the step of reissuing a previous fetch comprises leaving unchanged the count of the program counter.

7. The method of claim 1, wherein the pipeline comprises a plurality of sequential stages preceding the decode stage, and the step of writing the fetched instruction into an instruction buffer comprises writing the fetched instruction to an instruction buffer operable to concurrently store a number of instructions less than or equal to the number of sequential stages preceding the decode stage, and no more.

8. A method of buffering instructions in a processor having an instruction buffer, the method comprising the steps of:
    buffering at least two instructions in the instruction buffer equal to the number of stages in the processor before the decode stage;
    detecting that the instruction buffer cannot receive any additional instructions;
    in response to detecting that the instruction buffer cannot receive any additional instructions, reissuing a previous fetch for an instruction in a memory until the instruction buffer is no longer full; and
    writing the fetched instruction into the instruction buffer after the instruction buffer is no longer full.

9. The method of claim 8, wherein the step of reissuing a previous fetch comprises fetching an instruction stored in a memory location having an address designated by a count of a program counter.

10. The method of claim 9, wherein the step of reissuing a previous fetch comprises adjusting the count of the program counter to a count corresponding to the address of the memory location from which a previous instruction was fetched.

11. The method of claim 10, wherein the step of reissuing a previous fetch comprises leaving unchanged the count of the program counter.

12. The method of claim 8, wherein the pipeline comprises a plurality of sequential stages preceding a decode stage, and the step of writing the fetched instruction to an instruction buffer comprises writing the fetched instruction to an instruction buffer operable to concurrently store a number of instructions less than or equal to the number of sequential stages preceding the decode stage, and no more.

13. The method of claim 8, wherein the step of detecting that the instruction buffer cannot receive any additional instructions comprises detecting that a portion of the pipeline is stalled.

14. A processor pipeline comprising:
    a plurality of sequential stages followed by a decode stage;
    a limited instruction buffer operable to concurrently store a number of instructions the number being at least two and [less than or] equal to the number of sequential stages, and no more;
    a counter system, the counter system including a counter for storing a count designating an address of a memory location that stores an instruction for receipt by the limited instruction buffer, the counter system operable to adjust the count of the counter based on a status of the decode stage; and the plurality of sequential stages comprising a fetch unit operable to fetch the instruction at the address designated by the count.

15. The processor pipeline of claim 14, wherein the counter system is operable to increment the count of the counter if the decode stage is not stalled and leave unchanged the count of the counter if the decode stage is stalled.

16. The processor pipeline of claim 14, wherein the counter system further comprises a multiplexer, the multiplexer operable to receive a control signal indicative of the status of the decode stage.

17. The processor pipeline of claim 16, wherein the multiplexer is operable to receive the count of the counter and an incremented count of the counter and is further operable to generate an output signal indicative of either the count of the counter or the incremented count of the counter, the output signal based on the control signal indicative of the status of the decode stage.

18. The processor pipeline of claim 14, wherein the counter system resides within the fetch stage.

19. The processor pipeline of claim 14, wherein the fetch unit comprises a prefetch stage and an instruction read stage.

20. The processor pipeline of claim 14, wherein the fetch unit comprises more than two stages.

* * * * *